United States Patent [19]

Eickman

[11] Patent Number: 4,458,039

[45] Date of Patent: Jul. 3, 1984

[54] THERMOTROPIC LIQUID CRYSTALLINE POLYMER BLEND WITH REDUCED SURFACE ABRASION

[75] Inventor: Nancy C. Eickman, Mountainside, N.J.

[73] Assignee: Celanese Corporation, New York, N.Y.

[21] Appl. No.: 464,272

[22] Filed: Feb. 7, 1983

[51] Int. Cl.³ .............................................. C08K 3/34
[52] U.S. Cl. ..................................... 523/216; 524/456
[58] Field of Search ........................... 524/456; 523/216

[56] References Cited

U.S. PATENT DOCUMENTS 3,764,576  10/1973  Russo .................................. 524/456
3,889,039   6/1975  Wainer ................................ 524/456
4,067,852   1/1978  Calundann ........................... 528/190

Primary Examiner—Lewis T. Jacobs
Attorney, Agent, or Firm—Burns, Doane, Swecker & Mathis

[57] ABSTRACT

A thermotropic liquid crystalline polymer matrix having wollastonite fibers incorporated therein for reinforcement to prepare a molding compound. The wollastonite fibers have an average aspect ratio of greater than 3 to 1, and may be coated on their surface with a coupling agent to produce better bonding between the fibers and the thermotropic liquid crystalline polymer. The surface abrasion of an article produced from a blend of wollastonite with a thermotropic liquid crystalline polymer is reduced as compared to that of unfilled polymer.

14 Claims, No Drawings

THERMOTROPIC LIQUID CRYSTALLINE POLYMER BLEND WITH REDUCED SURFACE ABRASION

BACKGROUND OF THE INVENTION

1. Field of the Invention

The present invention relates to thermotropic liquid crystalline polymers reinforced with wollastonite, and more particularly, to the production of molding compounds and molded or extruded articles produced from such reinforced thermotropic liquid crystalline polymers.

2. Description of the Prior Art

Many thermotropic liquid crystalline polymers have poor surface characteristics, particularly with respect to abrasion. One attempt to reduce such abrasion has been the incorporation of various fillers and reinforcing agents.

For example, the use of various fillers is disclosed in commonly-assigned U.S. Pat. No. 4,067,852 to Calundann. Calundann teaches that fillers and/or reinforcing agents may be included in a total concentration of about 1 to 60% by weight of the resulting molding compound. Representative fibers which may serve as reinforcing media therein include glass fibers, asbestos, graphitic carbon fibers, amorphous carbon fibers, synthetic polymeric fibers, aluminum fibers, aluminum silicate fibers, oxide of aluminum fibers, titanium fibers, magnesium fibers, rock wool fibers, steel fibers, tungsten fibers, cotton wool, and wood cellulose fibers, etc. If desired, the fibrous reinforcement may be preliminarily treated to improve its adhesion ability to the liquid crystalline polymer which ultimately serves as a continuous matrix phase. Representative filler materials disclosed in Calundann include calcium silicate, silica, clays, talc, mica, polytetrafluoroethylene, graphite, aluminum trihydrate, sodium aluminum carbonate, barium ferrite, etc.

U.S. Pat. No. 4,267,304 to Feasey et al discloses the use of reinforcing fillers such as glass fibers, asbestos, aluminum silicate fibers, and synthetic polymer fibers, as well as the use of particulate fillers such as kaolin, chalk, silica, and glass ballottini.

Thus, the incorporation of various fillers and reinforcements into liquid crystalline polymers has been investigated as shown above. However, although the surface abrasion can be reduced by blending mineral fillers such as talc and mica into liquid crystalline polymer, mechanical properties such as tensile strength and impact strength are significantly reduced in such blends. Although reinforcements such as carbon fiber also reduce surface abrasion, they are much more expensive than mineral fillers.

Another filler which is not mentioned in any of the above patents is wollastonite. Wollastonite is a naturally occurring calcium silicate found in metamorphic rocks having the chemical formula $CaSiO_3$. The reference in Calundann to calcium silicate is not equivalent to wollastonite since the term "calcium silicate" does not specify the chemical stoichiometry ($CaSiO_3$, $Ca_2SiO_4$, and $Ca_3SiO_5$, for example, are all calcium silicates). Furthermore, commercially prepared calcium silicate could be a powder, while wollastonite particles are acicular; that is, they are shaped like small needles or spines. Thus, the wollastonite can function as a fibrous reinforcing agent rather than just as a filler.

The use of wollastonite in combination with liquid crystalline polymers is disclosed in European Patent Application No. 81/302836.2 of Bailey et al. Bailey et al describe the use of inert fillers at greater than 10% by volume and preferably higher than 20% by volume, to obtain a reduction in anisotropy ratio. The inert fillers in Bailey et al include particulate or fibrous fillers which do not react with the polymer of the composition but may have been surface treated to make them more compatible with the polymer matrix. The preferred class of fillers is glass fibers in the form of short fibers (one specific example uses three millimeter glass fibers) or glass mats. Although wollastonite is used in one example at a concentration of 70% by weight (53.7% by volume), no information is given concerning the size or aspect ratio of the wollastonite. By "aspect ratio" is meant the ratio of length to diameter of the fibers.

Accordingly, a need exists for a thermotropic liquid crystalline polymer blend which is less subject to surface abrasion without a concomitant large reduction in mechanical properties, such as tensile strength and impact strength. Furthermore, the reinforcing agent should be relatively inexpensive so as to not increase the overall cost of articles made from the polymer blend.

SUMMARY OF THE INVENTION

The present invention comprises a thermotropic liquid crystalline polymer matrix having wollastonite fibers incorporated therein for reinforcement to prepare a molding compound. The wollastonite fibers have an average aspect ratio of greater than 3 to 1, and may be coated on their surface with a coupling agent to produce better bonding between the fibers and the thermotropic liquid crystalline polymer.

In a preferred embodiment, the wollastonite fibers have an average aspect ratio of at least 10 to 1 and also are treated with a titanate coupling agent.

The resulting molding compound can be used to prepare molded or extruded articles which possess a reduced tendency for surface abrasion while maintaining the mechanical properties at essentially the same level as that of unfilled thermotropic liquid crystalline polymer. Thus, the liquid crystalline polymer blend of the present invention can be used for various plastics applications requiring reduced surface abrasion.

DETAILED DESCRIPTION OF THE INVENTION

The wollastonite fibers used in the present invention have an average aspect ratio of greater than about 3 to 1, more preferably at least about 10 to 1, and most preferably at least about 20 to 1. Suitable wollastonite fibers are available commercially from various sources. A particularly useful wollastonite fiber has an average diameter of about 3.5 microns and an average aspect ratio of about 20 to 1.

While beneficial results will be seen from the use of any amount of wollastonite fibers, it is preferred that the loading fall between about 10% and about 70% by weight, and more preferably between about 10% and about 40% by weight.

While not essential, it is preferred that the wollastonite fibers be treated with a titanate coupling agent. One coupling agent which has been used successfully is isopropyl tri(dioctylpyrophosphate)titanate, although other coupling agents may give similarly beneficial results. Wollastonite already treated with coupling agents or other surface treatments can be purchased from commercial suppliers.

Representative classes of polymers from which the thermotropic liquid crystalline polymer suitable for use in the present invention may be selected include wholly aromatic polyesters, aromatic-aliphatic polyesters, wholly aromatic poly(ester-amides), aromatic-aliphatic poly(ester-amides), aromatic polyazomethines, aromatic polyester-carbonates, and mixtures of the same. In preferred embodiments the thermotropic liquid crystalline polymer is a wholly aromatic polyester, a wholly aromatic poly(ester-amide), or an aromatic-aliphatic poly(ester-amide), and mixtures of the same. In such wholly aromatic polyester and wholly aromatic poly(ester-amide) each moiety present within the polymer chain contributes at least one aromatic ring. Also, it is preferred that naphthalene moieties be included in the thermotropic liquid crystalline polymer, e.g., 6-oxy-2-naphthoyl moiety, 2,6-dioxynaphthalene moiety, or 2,6-dicarboxynaphthalene moiety, in a concentration of not less than about 10 mole percent. The particularly preferred naphthalene moiety for inclusion in the thermotropic liquid crystalline polymer is the 6-oxy-2-naphthoyl moiety in a concentration of not less than about 10 mole percent.

Representative wholly aromatic polyesters which exhibit thermotropic liquid crystalline properties include those disclosed in the following United States Patents which are herein incorporated by reference Nos.: 3,991,013; 3,991,014; 4,066,620; 4,067,852; 4,075,262; 4,083,829; 4,093,595; 4,118,372; 4,130,545; 4,146,702; 4,153,779; 4,156,070; 4,159,365; 4,161,470; 4,169,933; 4,181,792; 4,183,895; 4,184,996; 4,188,476; 4,201,856; 4,219,461; 4,224,433; 4,226,970; 4,230,817; 4,232,143; 4,232,144; 4,238,598; 4,238,599; 4,238,600; 4,242,496; 4,245,082; 4,245,084; 4,247,514; 4,256,624; 4,265,802; 4,267,304; 4,269,965; 4,279,803; 4,294,955; 4,299,756; 4,318,841; 4,337,190; and 4,337,191; and 4,355,134. As discussed hereafter the wholly aromatic polyesters of U.S. Pat. Nos. 4,161,470 and 4,256,624 are particularly preferred for use in the present invention.

Representative aromatic-aliphatic polyesters which exhibit thermotropic liquid crystalline properties are copolymers of polyethylene terephthalate and hydroxybenzoic acid as disclosed in *Polyester X-7G-A Self Reinforced Thermoplastic*, by W. J. Jackson, Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1–4. A further disclosure of such copolymers can be found in "Liquid Crystal Polymers: I Preparation and Properties of p-Hydroxybenzoic Acid Copolymers, *Journal of Polymer Science, Polymer Chemistry Edition*, Vol. 14, pages 2043 to 2058 (1976), by W. J. Jackson, Jr. and H. F. Kuhfuss. See also U.S. Pat No. 4,138,842 and commonly assigned U.S. Pat. No. 4,355,133 which are herein incorporated by reference.

Representative wholly aromatic and aromatic-aliphatic poly(ester-amides) which exhibit thermotropic liquid crystalline properties are disclosed in U.S. Pat. Nos. 4,272,625; 4,330,457; 4,339,375; 4,341,688; 4,351,917; 4,351,918; and 4,355,132. As discussed hereafter the poly(ester-amide) of U.S. Pat. No. 4,330,457 is particularly preferred for use in the present invention.

Representative aromatic polyazomethines which exhibit thermotropic liquid crystalline properties are disclosed in U.S. Pat. Nos. 3,493,522; 3,493,524; 3,503,739; 3,516,970; 3,516,971; 3,526,611; 4,048,148; and 4,122,070. Each of these patents is herein incorporated by reference in its entirety. Specific examples of such polymers include poly(nitrilo-2-methyl-1,4-phenylenenitriloethylidyne-1,4-phenyleneethylidyne); poly(nitrilo-2-methyl-1,4-phenylenenitrilomethylidyne-1,4-phenylene-methylidyne); and poly(nitrilo-2-chloro-1,4-phenylenenitrilomethylidyne-1,4-phenylene-methylidyne).

Representative aromatic polyester-carbonates which exhibit thermotropic liquid crystalline properties are disclosed in U.S. Pat. Nos. 4,107,143, and 4,284,757, and in commonly assigned U.S. Ser. No. 319,024, filed Nov. 6, 1981, now U.S. Pat. No. 4,371,660, which are herein incorporated by reference. Examples of such polymers include those consisting essentially of p-oxybenzoyl units, p-dioxyphenyl units, dioxycarbonyl units, and terephthoyl units.

A thermotropic liquid crystalline polymer commonly is selected for use in the present invention which possesses a melting temperature within the range that is amenable to melt extrusion or molding while employing commercially available equipment. For instance, thermotropic liquid crystalline polymers are selected which exhibit a melting temperature somewhere within the range of approximately 250° to 400° C.

The thermotropic liquid crystalline polymer selected preferably also exhibits an inherent viscosity of at least 1.0 dl./g. when dissolved in a concentration of 0.1 percent by weight in pentafluorophenol at 60° C. (e.g., an inherent viscosity of approximately 1.0 to 15.0 dl./g.).

A particularly preferred wholly aromatic polyester for use in the present invention is that disclosed in U.S. Pat. No. 4,161,470 which is capable of forming an anisotropic melt phase at a temperature below approximately 350° C. This polyester consists essentially of the recurring moieties I and II wherein:

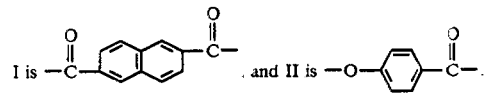

The polyester comprises approximately 10 to 90 mole percent of moiety I, and approximately 10 to 90 mole percent of moiety II. In one embodiment, moiety II is present in a concentration of approximately 65 to 85 mole percent, and preferably in a concentration of approximately 70 to 80 mole percent, e.g., approximately 73 mole percent. In another embodiment, moiety II is present in a lesser proportion of approximately 15 to 35 mole percent, and preferably in a concentration of approximately 20 to 30 mole percent. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof. Such polymer preferably has an inherent viscosity of approximately 3.5 to 10 dl./g. when dissolved in a concentration of 0.1 percent by weight of pentafluorophenol at 60° C.

Another particularly preferred wholly aromatic polyester for use in the present invention is that disclosed in U.S. Pat. No. 4,256,624 which is capable of forming an anisotropic melt phase at a temperature below approximately 400° C. This polyester consists essentially of the recurring moieties I, II, and III which may include substitution of at least some of the hydrogen atoms present upon an aromatic ring wherein:

I is 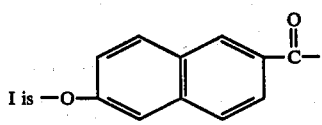 ;

II is a dioxy aryl moiety of the formula —O—Ar—O— where Ar is a divalent radical comprising at least one aromatic ring; and III is a dicarboxy aryl moiety of the formula

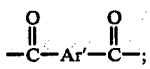

where Ar' is a divalent radical comprising at least one aromatic ring; with said optional substitution if present being selected from the group consisting of an alkyl group of 1 to 4 carbon atoms, an alkoxy group of 1 to 4 carbon atoms, halogen, a phenyl group and mixtures of the foregoing, and wherein said polyester comprises approximately 10 to 90 mole percent of moiety I, approximately 5 to 45 mole percent of moiety II, and approximately 5 to 45 mole percent of moiety III.

A particularly preferred wholly aromatic poly(ester-amide) or aromatic-aliphatic poly(ester-amide) for use in the present invention is disclosed in U.S. Pat. No. 4,330,457, which is capable of forming an anisotropic melt phase at a temperature below approximately 400° C. The poly(ester-amide)s there disclosed consist essentially of recurring moieties I, II, III, and, optionally, IV wherein:

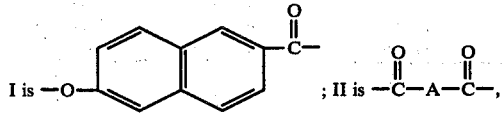

where A is a divalent radical comprising at least one aromatic ring or a divalent trans-1,4-cyclohexylene radical;

III is —Y—Ar—Z—, where Ar is a divalent radical comprising at least one aromatic ring, Y is O, NH, or NR, and Z is NH or NR, where R is an alkyl group of 1 to 6 carbon atoms or an aryl group; and IV is —O—Ar'—O—, where Ar' is a divalent radical comprising at least one aromatic ring;

wherein at least some of the hydrogen atoms present upon the rings optionally may be replaced by substitution selected from the group consisting of alkyl group of 1 to 4 carbon atoms, an alkoxy group of 1 to 4 carbon atoms, halogen, phenyl, and mixtures thereof, and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV. The preferred dicarboxy aryl moiety II is:

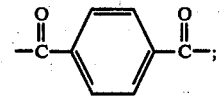

the preferred moiety III is:

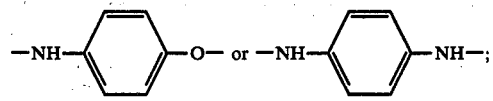

and the preferred dioxy aryl moiety IV is:

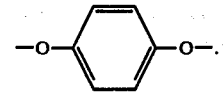

Such polymer preferably has an inherent viscosity of approximately 2.0 to 10 dl./g. when dissolved in a concentration of 0.1 percent by weight in pentafluorophenol at 60° C.

The wollastonite fibers may be incorporated into the liquid crystalline polymer by a melt admixture technique to form an injection molding compound. In addition, any of the commonly used blending techniques can be also used in conjunction with commercially available equipment.

The resulting blend can be melt processed to form a variety of shaped articles, e.g., molded tri-dimensional articles. The blend of the present invention is particularly suited for molding applications and can be molded by standard injection molding techniques commonly utilized when forming molded articles. The melt blend can also be melt extruded if desired.

The following examples are presented as specific illustrations of the claimed invention. It should be understood, however, that the invention is not limited to the specific details set forth in the examples.

EXAMPLE 1

A wholly aromatic polyester which exhibits thermotropic liquid crystalline properties was selected for use in the formation of an injection molded article in accordance with the present invention. The wholly aromatic polyester was formed in accordance with the teachings of U.S. Pat. No. 4,161,470, and consisted of 73 mole percent of recurring p-oxybenzoyl units and 27 mole percent of recurring 6-oxy-2-naphthoyl units. The wholly aromatic polyester exhibited an inherent viscosity of 6.0 dl./g. when dissolved in a concentration of 0.1 percent by weight in pentafluorophenol at 60° C., and had a differential scanning calorimetry melting temperature peak of 289° C.

The above wholly aromatic polyester was used to prepare the various samples used for testing. Blending with the various fibers at 15 weight percent of fiber was accomplished on a corotating twin screw extruder (28 mm ZSK, manufactured by Werner-Pfleiderer). The extrusion was accomplished at a cylinder temperature of 570° F., a percent torque between 20 and 50, using 150 rpm, without a vacuum when unfilled wholly aromatic polyester was being extruded, and a vacuum of 27 inches when fibers were being added. The unfilled wholly aromatic polyester was put through the same blending process as the fiber containing wholly aromatic polyester to insure that all samples had been subjected to the same treatment. The composition of samples A–F is shown in Table I:

TABLE I

| Sample | Wollastonite Fiber | |
|---|---|---|
| | Average Aspect Ratio | Coupling Agent |
| A | Unfilled | — |
| B | 20:1 | None |
| C | 3:1 | None |
| D | 20:1 | Silane |
| E | 3:1 | Silane |
| F | 20:1 | Titanate |
| G | 3:1 | Titanate |

All of the wollastonite fibers were purchased from Nyco, Inc., Willsboro, N.Y. The commercial designations are as follows:

| Sample | |
|---|---|
| B | NYAD G Wollastonite |
| C | NYAD 400 Wollastonite |
| D | G Wollastokup 174-2 |
| E | 400 Wollastokup 174-2 |
| F | G Wollastokup KR 38-2 |
| G | 400 Wollastokup KR 38-2 |

After extrusion, samples of each of the above were dried in a vacuum oven overnight at 120° C., then injection molded at 300° C. on an 0.8 oz. Arburg injection molding machine under the following molding conditions:

| Cylinder Temperature | |
|---|---|
| Rear (°C.) | 300 |
| Center | 300 |
| Front | 300 |
| Nozzle | 300 |
| Mold Temperature (°C.) | 80 |
| Cycle Time (Seconds) | |
| Injection | 10 |
| Cooling | 20 |
| Delay | 3 |
| Total | 33 |
| Screw rpm | 250 |
| Injection Pressure (psi) | 8000 |

The resulting bars had configurations of standard molding bars according to ASTM specifications for the tests set forth below.

To illustrate the improvements resulting from the use of wollastonite fibers, the bars made from Samples A–F were tested according to ASTM D-638 for tensile strength and modulus. The results are set forth in Table II:

TABLE II

| | Tensile Modulus | | Tensile Strength | |
|---|---|---|---|---|
| Sample | Actual Value ($10^6$ psi) | Percent Change Compared to Unfilled | Actual Value (psi) | Percent Change Compared to Unfilled |
| A | 1.99 | — | 37,700 | — |
| B | 2.14 | +8 | 31,200 | −17 |
| C | 1.79 | −10 | 29,900 | −21 |
| D | 1.97 | −1 | 29,300 | −22 |
| E | 1.69 | −15 | 26,700 | −29 |
| F | 2.16 | +9 | 32,900 | −13 |

TABLE II-continued

| | Tensile Modulus | | Tensile Strength | |
|---|---|---|---|---|
| Sample | Actual Value ($10^6$ psi) | Percent Change Compared to Unfilled | Actual Value (psi) | Percent Change Compared to Unfilled |
| G | 1.80 | −10 | 33,100 | −12 |

As can be seen, a coating with a silane coupling agent is actually detrimental to tensile strength and modulus, whereas a titanate agent has a very beneficial effect. In addition, it is readily seen, especially in the case of tensile strength, that a blend including high aspect ratio wollastonite fibers results in a significant improvement over that obtained with low aspect ratio wollastonite.

EXAMPLE 2

In order to demonstrate the effect on mechanical properties of varying the loading level of wollastonite fibers in liquid crystalline polymer, the following tests were performed.

Appropriate samples for performing each of the ASTM tests set forth below were prepared by adding G Wollastokup KR38-2 wollastonite fibers (average aspect ratio 20:1; coated with a titanate coupling agent) to the thermotropic liquid crystalline polymer described in Example 1 (but with an inherent viscosity of 4.34 dl./g. when dissolved in a concentration of 0.1 percent by weight in pentafluorophenol at 60° C.).

Tensile strength and tensile modulus were tested in accordance with ASTM D-638. Flexural strength and flexural modulus were tested in accordance with ASTM D-790. Notched Izod impact strength was tested according to ASTM D-256.

The results of these tests are shown in Table III:

TABLE III

| Wollastonite (Weight %) | Tensile Modulus ($10^6$ psi) | Tensile Strength ($10^3$ psi) |
|---|---|---|
| 0 | 1.71 | 29.7 |
| 10 | 1.68 | 29.8 |
| 20 | 1.69 | 26.8 |
| 30 | 1.82 | 24.8 |
| 40 | 1.89 | 20.1 |
| 50 | 2.16 | 16.7 |

| Wollastonite (Weight %) | Flexural Modulus ($10^6$ psi) | Flexural Strength ($10^3$ psi) | Notched Izod (ft-lbs/in) |
|---|---|---|---|
| 0 | 1.22 | 22.5 | 1.0 |
| 10 | 1.28 | 22.9 | 0.8 |
| 20 | 1.5 | 24.4 | 0.8 |
| 30 | 1.65 | 24.7 | 0.7 |
| 40 | 1.87 | 24.1 | 0.5 |
| 50 | 2.21 | 22.4 | 0.3 |

As can be seen from a review of the data in Table III, the following general trends are indicated: (1) tensile modulus is unaffected by increasing amounts of wollastonite fibers; (2) flexural modulus and strength increase slightly with increasing levels of wollastonite fibers; and (3) tensile strength and notched Izod impact strength decrease with increasing wollastonite fiber loading.

EXAMPLE 3

The following example demonstrates the surprising advantages resulting from the use of wollastonite fibers as compared to the use of mineral fillers such as mica, talc, or calcium carbonate. Samples were prepared as in Example 1 by adding 15 weight percent of mica, talc, calcium carbonate, or G Wollastokup KR38-2 wollastonite fibers (average aspect ratio of 20 to 1; coated with titanate coupling agent) to the thermotropic liquid crystalline polymer of Example 1.

The results obtained when tested as in Example 1 are set forth in Table IV:

TABLE IV

| | Tensile Modulus | | Tensile Strength | |
|---|---|---|---|---|
| Sample | Actual Value ($10^6$ psi) | Percent Change Compared to Unfilled | Actual Value (psi) | Percent Change Compared to Unfilled |
| Unfilled | 1.95 | — | 38,400 | — |
| Wollastonite | 1.96 | +1 | 33,800 | −12 |
| Mica | 1.93 | −1 | 25,000 | −35 |
| Talc | 1.72 | −12 | 31,800 | −17 |
| CaCO$_3$ | 1.10 | −44 | 13,900 | −64 |

The data in Table IV clearly illustrate that wollastonite fibers produce superior mechanical properties when blended with thermotropic liquid crystalline polymers.

EXAMPLE 4

That the surface abrasion is reduced by the addition of wollastonite is shown by the following example.

The surfaces of injection-molded four-inch diameter disks were abraded using a Taber abraser. The test procedures and equipment are described in ASTM D-1044. A 1000 g load was used with a CS-17 wheel. Surface abrasion was measured by the amount of sample weight loss after a given number of cycles of revolution of the abrasive wheels.

The samples tested were prepared as in Example 1. After 10,000 cycles, the unfilled polymer lost a total of 458 mg of material. The blend of 15 weight percent of G Wollastokup KR38-2 with the polymer showed a weight loss of only 111 mg of material after 10,000 cycles, thus demonstrating the beneficial effect of wollastonite on surface wear characteristics.

Although the invention has been described in terms of various preferred embodiments, one skilled in the art will appreciate that various modifications, substitutions, omissions, and changes may be made without departing from the spirit thereof. Accordingly, it is intended that the scope of the present invention be limited solely by the scope of the following claims.

What is claimed is:

1. A molding compound comprising a thermotropic liquid crystalline polymer matrix having wollastonite fibers incorporated therein, the wollastonite fibers having an average aspect ratio of greater than about 3 to 1.

2. The molding compound of claim 1 wherein the wollastonite fibers have an average aspect ratio of at least 10 to 1.

3. The molding compound of claim 1 wherein the wollastonite fibers have an average aspect ratio of at least 20 to 1.

4. The molding compound of claim 1 wherein the wollastonite fibers are treated with a titanate coupling agent prior to being blended with the thermotropic liquid crystalline polymer to produce the molding compound.

5. The molding compound of claim 1 wherein the wollastonite fibers are present in the molding compound at between about 10 and about 70% by weight.

6. The molding compound of claim 1 wherein the wollastonite fibers are present in the molding compound at between about 10 and about 40% by weight.

7. The molding compound of claim 1 wherein the thermotropic liquid crystalline polymer has an inherent viscosity of between about 1.0 and about 15 dl./g. when dissolved in a concentration of 0.1 percent by weight of pentafluorophenol at 60° C.

8. The molding compound of claim 1 wherein the thermotropic liquid crystalline polymer is selected from the group consisting of a wholly aromatic polyester, an aromatic-aliphatic polyester, a wholly aromatic poly(ester-amide), an aromatic-aliphatic poly(ester-amide), an aromatic polyazomethine, an aromatic polyester-carbonate, and mixtures thereof.

9. The molding compound of claim 1, wherein the thermotropic liquid crystalline polymer is selected from the group consisting of a wholly aromatic polyester, a wholly aromatic poly(ester-amide), an aromatic-aliphatic poly(ester-amide), and mixtures thereof.

10. The molding compound of claim 1, wherein the thermotropic liquid crystalline polymer is a melt processable poly(ester-amide) capable of forming an anisotropic melt phase at a temperature below approximately 400° C. consisting essentially of recurring moieties I, II, III, and, optionally, IV wherein:

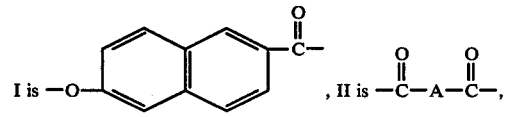

where A is a divalent radical comprising at least one aromatic ring or a divalent trans-1,4-cyclohexylene radical;

III is —Y—Ar—Z—, where Ar is a divalent radical comprising at least one aromatic ring, Y is O, NH, or NR, and Z is NH or NR, where R is an alkyl group of 1 to 6 carbon atoms or an aryl group; and IV is —O—Ar'—O—, where Ar' is a divalent radical comprising at least one aromatic ring;

wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof, and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV.

11. The molding compound of claim 1, wherein the thermotropic liquid crystalline polymer is a melt processable wholly aromatic polyester capable of forming an anisotropic melt phase at a temperature below approximately 400° C., consisting essentially of the recurring moieties I, II, and III which may include substitution of at least some of the hydrogen atoms present upon an aromatic ring wherein:

I is 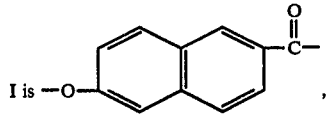,

II is a dioxy aryl moiety of the formula —O—Ar—O— where Ar is a divalent radical comprising at least one aromatic ring, and III is a dicarboxy aryl moiety of the formula

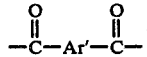

where Ar' is a divalent radical comprising at least one aromatic ring,
with said optional substitution if present being selected from the group consisting of an alkyl group of 1 to 4 carbon atoms, an alkoxy group of 1 to 4 carbon atoms, halogen, a phenyl group and mixtures of the foregoing, and wherein said polyester comprises approximately 10 to 90 mole percent of moiety I, approximately 5 to 45 mole percent of moiety II, and approximately 5 to 45 mole percent of moiety III.

12. The molding compound of claim 1, wherein the thermotropic liquid crystalline polymer is a melt processable wholly aromatic polyester capable of forming a thermotropic melt phase at a temperature below approximately 350° C. consisting essentially of the recurring moieties I and II which may include substitution of at least some of the hydrogen atoms present upon an aromatic ring wherein:

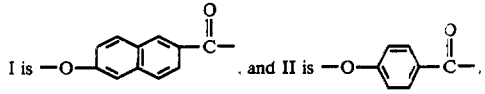

with said optional substitution if present being selected from the group consisting of an alkyl group of 1 to 4 carbon atoms, an alkoxy group of 1 to 4 carbon atoms, halogen, phenyl, and mixtures of the foregoing, and wherein said polyester comprises approximately 10 to 90 mole percent of moiety I, and approximately 10 to 90 percent of moiety II.

13. A molded article produced from the molding compound of claim 1.

14. An extruded article produced from the molding compound of claim 1.